Sept. 24, 1957 J. W. JACOBS 2,807,172
VARIABLE SPEED TRANSMISSION
Filed Aug. 12, 1953 4 Sheets-Sheet 1

INVENTOR.
James W. Jacobs
BY
R. R. Candor
His Attorney

Sept. 24, 1957   J. W. JACOBS   2,807,172
VARIABLE SPEED TRANSMISSION
Filed Aug. 12, 1953   4 Sheets-Sheet 2

INVENTOR.
James W. Jacobs
By R R Caudor
His Attorney

Sept. 24, 1957　　　J. W. JACOBS　　　2,807,172
VARIABLE SPEED TRANSMISSION

Filed Aug. 12, 1953　　　　　　　　　4 Sheets-Sheet 3

INVENTOR.
James W. Jacobs
BY　*R R Cauder*
His Attorney

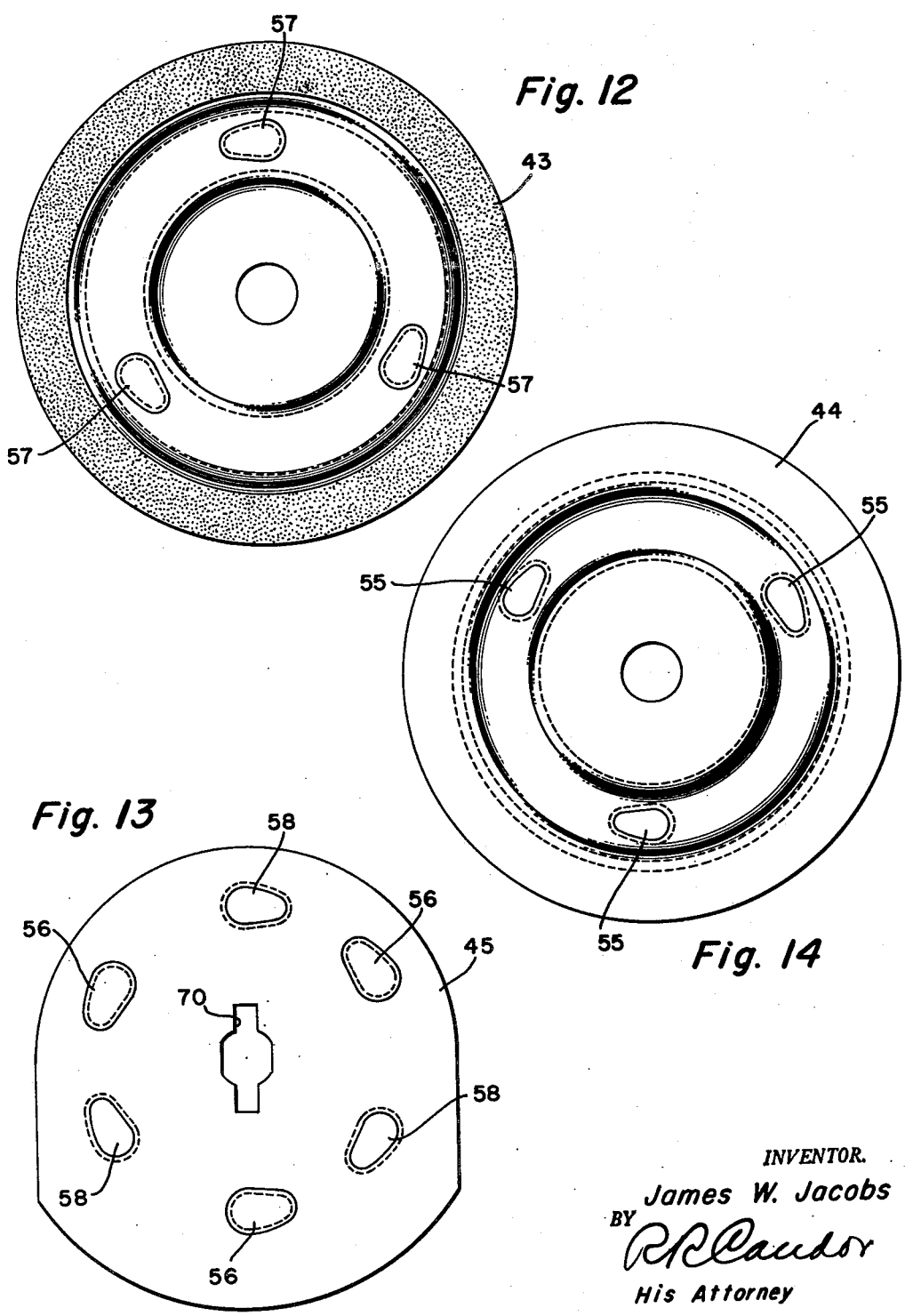

United States Patent Office 2,807,172
Patented Sept. 24, 1957

2,807,172

VARIABLE SPEED TRANSMISSION

James W. Jacobs, Dayton, Ohio, assignor to General Motors Corporation, Detroit, Mich., a corporation of Delaware Application August 12, 1953, Serial No. 373,853

18 Claims. (Cl. 74—336.5)

This invention relates to a variable speed transmission and more particularly to a two-speed transmission for the compressor of said apparatus.

An object of this invention is to provide an improved two-speed transmission.

Another object of this invention is to provide an improved two-speed transmission utilizing ball and groove construction for locking the transmission.

Another object of this invention is to provide an improved two-speed transmission with a speed governor.

Another object of this invention is to provide a two-speed transmission with a speed governor and a manual control for declutching the driven member.

Another object of this invention is to provide an improved refrigerant compressor with a two-speed transmission for driving the same.

Another object of this invention is to provide an improved automobile air conditioning system driven by a two-speed transmission from the automobile engine.

Further objects and advantages of the present invention will be apparent from the following description, reference being had to the accompanying drawings wherein a preferred form of the invention is clearly shown.

Figure 1:
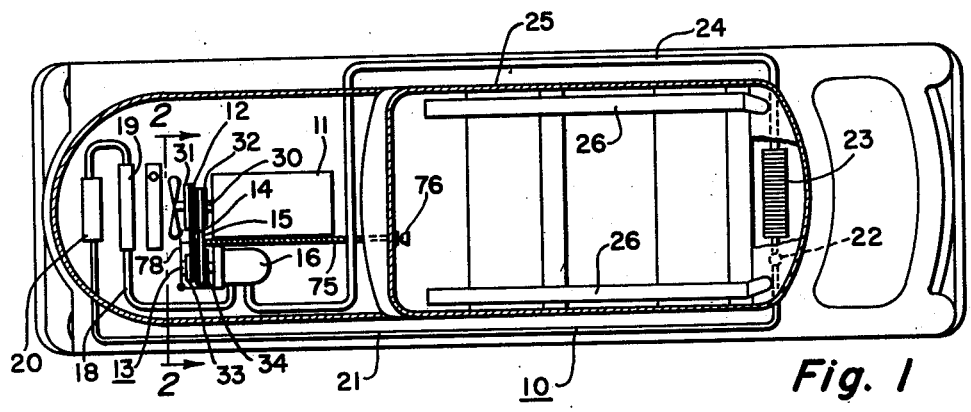
Figure 1 is a horizontal view cross-section, somewhat diagrammatic, of an automobile embodying my invention.
Figure 2:
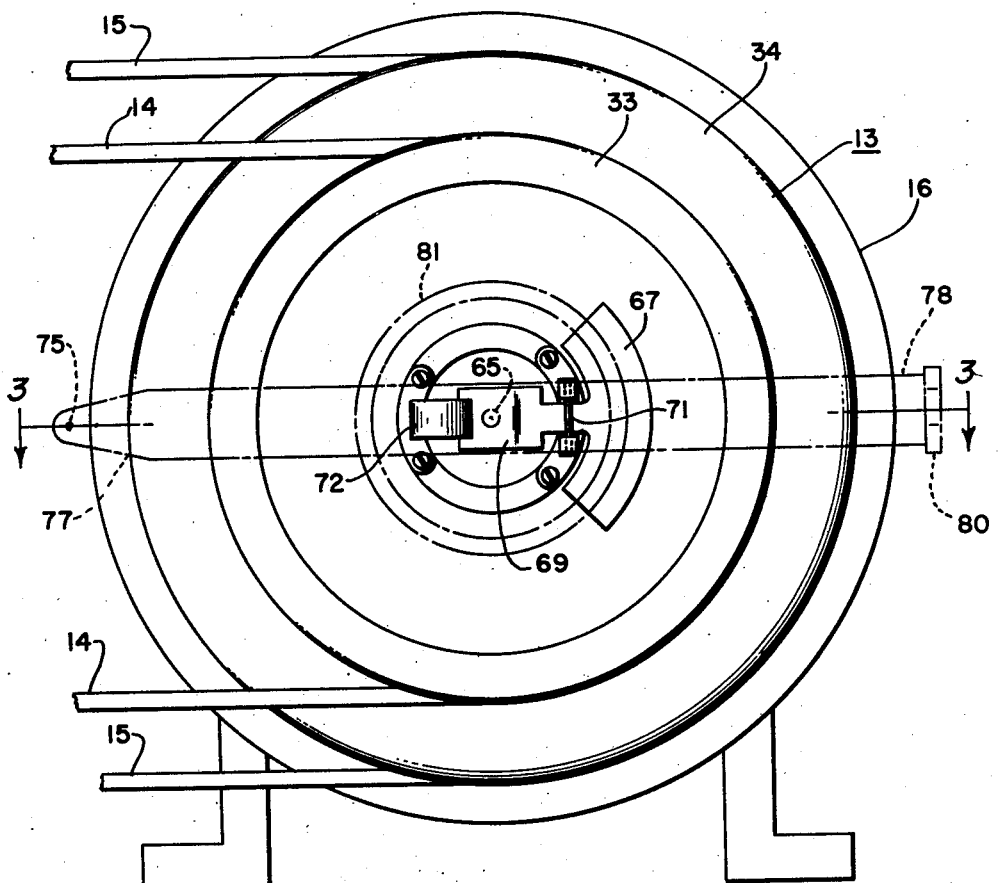
Figure 2 is a front view, on an enlarged scale, of the two-speed transmission.
Figure 3:
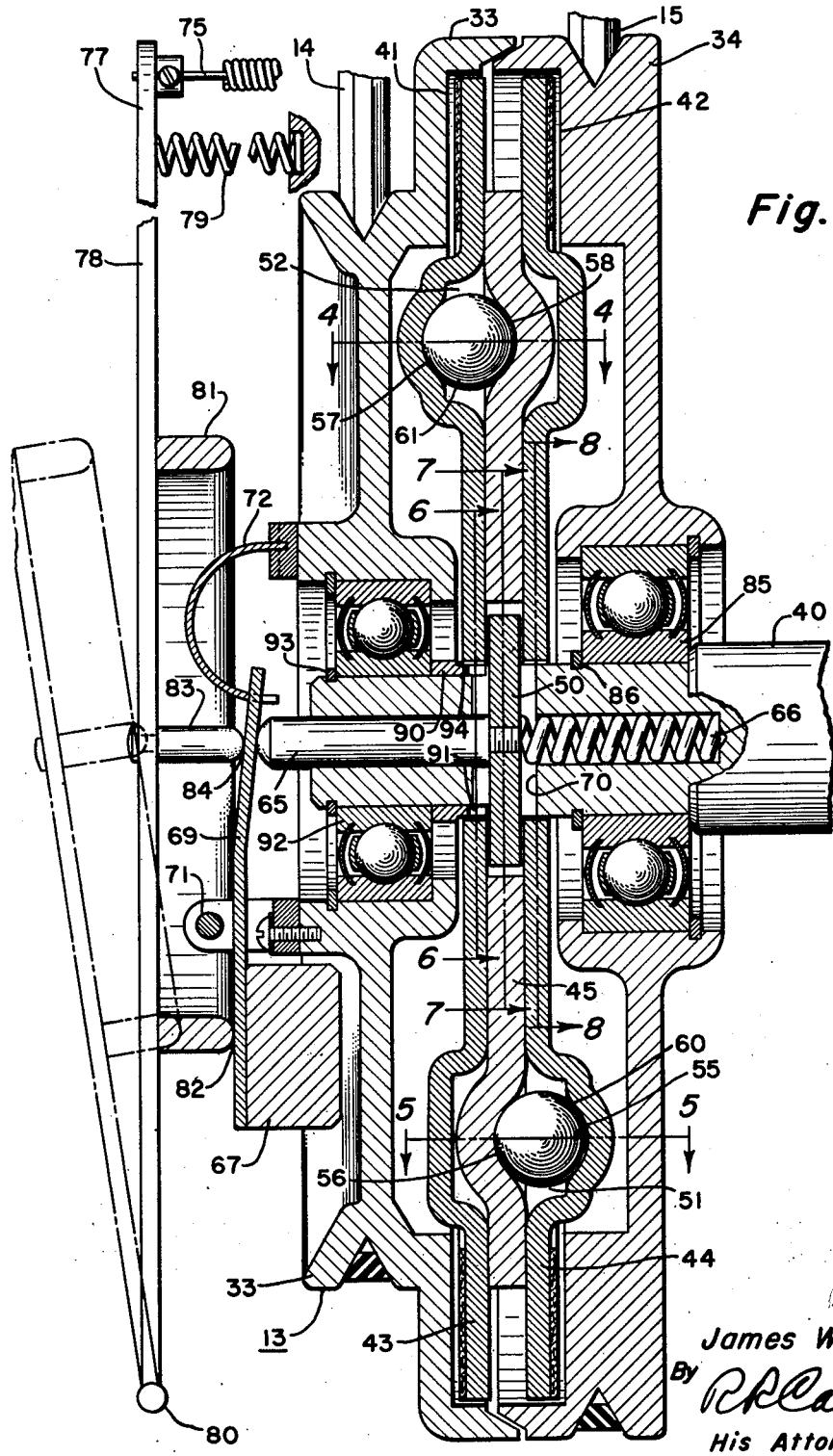
Figure 3 is a horizontal cross-section, on a further enlarged scale, taken along the line 3—3 of Figure 2.

Figures 12, 13 and 14 are side views, on a different scale, of discs 43, 44 and 45 looking toward the right in Figure 3.

An automobile 10 is provided with an automobile engine 11 having a pulley construction 12 attached to or driven by the crank shaft of the engine. A two-speed transmission 13 is driven by the belts 14 and 15 and drives the compressor 16. The two-speed transmission 13 is controlled by the speed governor 67 in such a manner that there is a high speed ratio between the engine and the compressor when the engine is operating at a relatively low speed, and there is a low speed ratio when the engine is operating at a relatively high speed. The compressor may be manually declutched from the engine when desired.

Refrigerant is compressed by the compressor 16 and is discharged through the line 18 to the condenser 19 which discharges liquefied refrigerant into the receiver 20. From there liquid refrigerant flows through the line 21 through the expansion valve 22 to the evaporator 23. The evaporated refrigerant flows through the line 24 back to the compressor 16 from whence it is recirculated through the same cycle.

Air within the body 25 of the automobile is circulated by a fan, not shown, past the evaporator 23 and is discharged, in the cooled condition, through the distribution ducts 26.

The speed ratio between the engine 11 and the compressor 16 is varied by the operation of the two-speed transmission 13. The variable speed engine shaft 30 drives the pulley construction 12 at a varying speed. Preferably, the pulley construction on the engine includes a large pulley 31 and a smaller pulley 32. These pulleys drive respectively the smaller pulley 33 and the larger pulley 34 of the two-speed transmission, through the medium of the belts 14 and 15.

The pulleys 33 and 34 comprise two clutch driving members rotatable at different speeds (different speed ratios) about the same axis as the clutch driven shaft 40. The pulleys 33 and 34 have drive surfaces 41 and 42 respectively. Two clutch discs 43 and 44 are longitudinally movable on the driven shaft 40 and are engageable respectively with the drive surfaces 41 and 42.

For the purpose of engaging the clutch discs 43 and 44 with the surfaces 41 and 42, a spread reaction disc 45 is placed between, coaxial with, having initial relative rotation with and having a limit of spread relative to, said clutch discs 43 and 44. The reaction disc 45 is longitudinally and rotationally locked to the driven shaft 40. It is rotationally locked through the medium of the flats or flat key 40a on shaft 40, and is longitudinally locked by means of ring 90, which in turn is longitudinally locked by ball race 92 and split retaining ring 93. This longitudinal and rotational locking arrangement of the disc 45 produces a limit of spread between the disc 45 and the discs 43 and 44 so that a slight initial relative rotation between the discs locks them together through the medium of the spreader means to be described.

The spreader means comprises two sets of ball and groove constructions 51 and 52. The construction 51 includes three grooves 55 on the disc 44 and three grooves 56 on the disc 45. The construction 52 includes three grooves 57 on the disc 43 and three grooves 58 on the disc 45. Three balls 60 are placed in the grooves 55 and 56, and three balls 61 are placed in the grooves 57 and 58. These three ball constructions insure a firm bearing between the reaction disc 45 and the clutch discs 43 and 44.

Initial relative rotation is produced between the selected discs by longitudinal movement of either of the discs 43 and 44 along the shaft 40. To this end, longitudinal actuator means in the form of a rod 65 is movable against the compression spring 66 through the medium of speed governor 67, which is mounted on the pulley 33. The rod 65 is threadedly secured to the transverse bar 50 which is placed within a slot 70 formed in the disc 45 and shaft 40.

Figure 5:
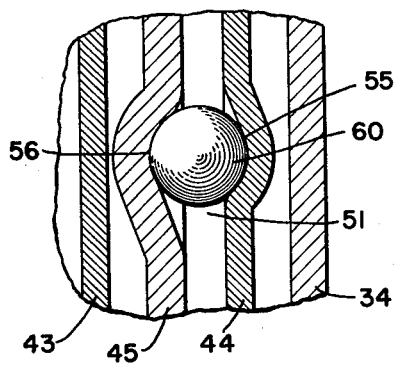
Figure 6:
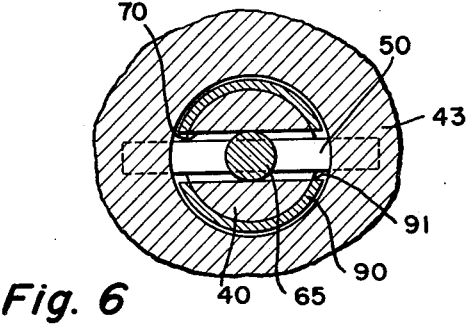
Figure 7:
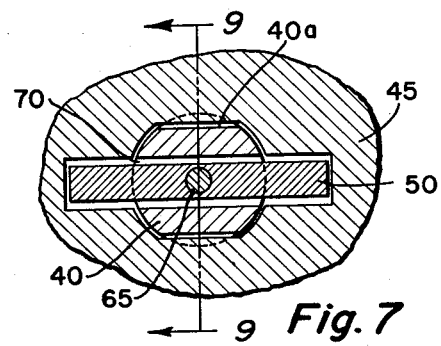
Figure 8:
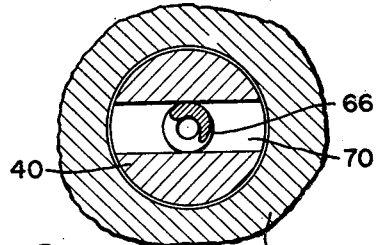
Figure 9:
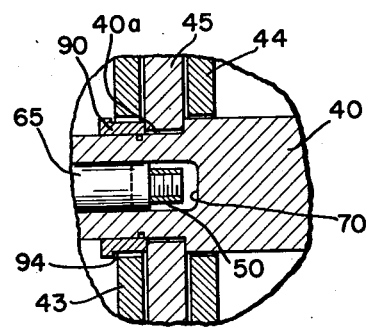
Figure 9 is a cross-sectional view taken along the line 9—9 of Figure 7.
Figure 10:
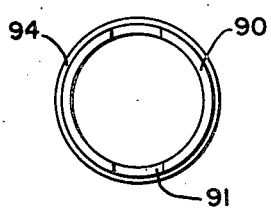
Figures 10 and 11 are end and top views of the retaining ring 90.
Figure 11:
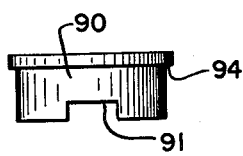

Movement of the rod 65 to the right (Figure 3) by the governor 67, causes the transverse bar 50 to move the disc 44 against the drive surface 42. This causes an initial relative rotation between the discs 44 and 45, and produces a wedging action within the spreader construction 51. By reference to Figure 5, it will be seen that the ball 60 wedges the grooves 55 and 56 apart. This increases the spreading action between the discs 44 and 45. Since the disc 45 is longitudinally fixed with respect to the shaft 40, the spreading reaction is concentrated in forcing the disc 44 tightly against the drive surface 42 and this produces a locked drive between the pulley 34 and the driven shaft 40. The compressor is then driven at the ratio between engine and the compressor produced by the belt 15.

Figure 4:
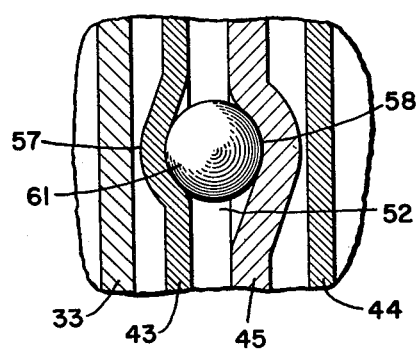
Figures 4 through 8 are cross-sectional views taken along the respective cross-sectional lines indicated in Figure 3.

When the governor 67 snaps the rod 65 to the left (Figure 3) a sufficient distance, the transverse bar 50 first releases the disc 44, so that it no longer drives the shaft 40. As the movement of the rod 65 continues, the tansverse bar 50 moves the disc 43 into engagement with the drive surface 41. This produces an initial relative rotation between the discs 43 and 45 which produces a rotational locking engagement through the medium of the ball construction shown in Figure 4 substantially similar to that heretofore described with respect to Figure 5. However, in this instance the pulley 33 drives the driven shaft 40 at a different ratio, as compared to the speed of the engine 11, from the ratio heretofore described with respect to pulley 34.

The snap-acting speed governor 67, which may be of any well-known speed responsive type, is so related to the rod 65 that the engine 11 drives the compressor at a relatively high ratio, through the belt 14, when the engine is operating at a relatively low speed. On the other hand, when the engine is operating at a relatively high speed, then the engine drives the compressor at a relatively low ratio, through the belt 15. This change of ratio drive between the engine and the compressor is entirely independent of the usual varying ratio drive (not shown) between the engine 11 and the wheels of the automobile. Hence, the compressor is driven at proper speed, regardless of whether the car is being operated in "low gear," "high gear," or whether the car ratio is varied by one of the liquid transmissions now frequently used.

The speed governor 67 includes the lever 69 pivoted on the fulcrum 71 carried by the pulley 33. This pulley also carries a circular toggle spring 72 in compression, so that the spring imparts a snap action to the lever 69 as the lever tends to swing back and forth under centrifugal force acting on the weight 67. This snap action is imparted to the rod 65 to vary the ratio as heretofore described.

The transmission may be controlled manually to put it in a non-driving position. To this end, a Bowden wire 75 is provided with a knob 76 which has the usual detent construction, not shown, to keep it in the selected positions. The Bowden wire moves the end 77 of the lever 78 against the compression spring 79. The lever 78 is fulcrumed at 80. The lever 78 is provided with a ring 81 which contacts the lever 69 at 82. The lever 78 is also provided with a pin 83 which contacts the lever at 84. When the Bowden wire knob 76 is manually actuated to put the lever 78 in the full line position shown in Figure 3, then the lever 69 of the speed governor is locked in a neutral or non-driving position. At this time the bar 50 is maintained in the non-driving position shown in Figure 3, so that it does not actuate either of the discs 43 or 44, and thus does not produce any driving action in the clutch.

If the compressor or other rotating part has a dynamic unbalance, the same may be counterbalanced by making the disc 45 unsymmetrical as shown in Figure 13. Otherwise, the disc 45 may be made circular.

The clutches may be assembled on the shaft 40 as follows. The pulley 34 is first assembled on the shaft 40, together with its lubricant sealed ball race 85. The ball race 85 is locked in place by the split ring 86. The discs 44 and 45 are then placed on the shaft followed by the spring 66, bar 50 and rod 65. The disc 45 is locked both rotationally and axially on the shaft 40 by means of the key or flats 40a and the ring 90 which has a tight fit on the shaft 40. The ring 90 is provided with a notch 91, which permits axial movement of the bar 50 in the slot 91 as well as in the slot 70 formed in the shaft 40 and disc 45. The ring 90 also has a shoulder 94 which retains the disc 43 on the shaft. Thereafter, the pulley 33 together with its lubricant sealed ball race 92 is assembled on the shaft and is locked in place by the split ring 93.

While the form of embodiment of the invention as herein disclosed constitutes a preferred form, it is to be understood that other forms might be adopted as may come within the scope of the claims which follow.

What is claimed is as follows:

1. A two-speed transmission comprising: a driven shaft; two driving members rotatable at different speeds about the same axis as said driven shaft, and each having a different drive surface; two clutch discs longitudinally movable on said driven shaft and engageable each with a said different drive surface; a spread reaction disc between, coaxial with, having initial relative rotation with, and having a limit of spread relatively to, said clutch discs; spreader means between said reaction disc and said clutch discs energized into locking engagement by said initial relative rotation; and longitudinal actuator means selectively and longitudinally to move said clutch discs to cause said spread reaction disc to have said initial relative rotation with respect to said clutch discs.

2. A two-speed transmission comprising: a driven shaft; two driving members rotatable at different speeds about the same axis as said driven shaft, and each having a different drive surface; two clutch discs longitudinally movable on said driven shaft and engageable each with a said different drive surface; a spread reaction disc between, coaxial with, having initial relative rotation with, and having a limit of spread relatively to, said clutch discs; spreader means between said reaction disc and said clutch discs energized into locking engagement by said initial relative rotation; longitudinal actuator means selectively and longitudinally to move said clutch discs to cause said spread reaction disc to have said initial relative rotation with respect to said clutch discs; and a speed governor controlling the operation of said longitudinal actuator means.

3. A two-speed transmission comprising: a driven shaft; two driving members rotatable at different speeds about the same axis as said driven shaft, and each having a different drive surface; two clutch discs longitudinally movable on said driven shaft and engageable each with a said different drive surface; a spread reaction disc between, coaxial with, having initial relative rotation with, and having a limit of spread relatively to, said clutch discs; ball and groove means between said reaction disc and said clutch discs energized into locking engagement by said initial relative rotation; and longitudinal actuator means selectively and longitudinally to move said clutch discs to cause said spread reaction disc to have said initial relative rotation with respect to said clutch discs.

4. A two-speed transmission comprising: a driven shaft; two driving members rotatable at different speeds about the same axis as said driven shaft, and each having a different drive surface; two clutch discs rotationally free from and longitudinally movable on said driven shaft and engageable each with a said different drive surface; a spread reaction disc between, coaxial with, having initial relative rotation with, and having a limit of spread relatively to, said clutch discs; spreader means between said reaction disc and said clutch discs energized into locking engagement by said initial relative rotation; and longitudinal actuator means selectively and longitudinally to move said clutch discs to cause said spread reaction disc to have said initial relative rotation with respect to said clutch discs.

5. A two-speed transmission comprising: a driven shaft; two driving members rotatable at different speeds about the same axis as said driven shaft, and each having a different drive surface; two clutch discs longitudinally movable on said driven shaft and engageable each with a said different drive surface; a spread reaction disc between, coaxial with, having initial relative rotation with, and having a limit of spread relatively to, said clutch discs and rotationally fixed on said driven shaft; spreader means between said reaction disc and said clutch discs energized into locking engagement by said initial relative rotation;

and longitudinal actuator means selectively and longitudinally to move said clutch discs to cause said spread reaction disc to have said initial relative rotation with respect to said clutch discs.

6. A two-speed transmission comprising: a driven shaft; two driving members rotatable at different speeds about the same axis as said driven shaft, and each having a different drive surface; two clutch discs rotationally free from and longitudinally movable on said driven shaft and engageable each with a said different drive surface; a spread reaction disc between, coaxial with, having initial relative rotation with, and having a limit of spread relatively to, said clutch discs and rotationally fixed on said driven shaft; spreader means between said reaction disc and said clutch discs energized into locking engagement by said initial relative rotation; and longitudinal actuator means selectively and longitudinally to move said clutch discs to cause said spread reaction disc to have said initial relative rotation with respect to said clutch discs.

7. A two-speed transmission comprising: a driven shaft; two driving members rotatable at different speeds about the same axis as said driven shaft, and each having a different drive surface; two clutch discs rotationally free from and longitudinally movable on said driven shaft and engageable each with a said different drive surface; a spread reaction disc between, coaxial with, having initial relative rotation with, and having a limit of spread relatively to, said clutch discs and rotationally fixed on said driven shaft; spreader means between said reaction disc and said clutch discs energized into locking engagement by said initial relative rotation; longitudinal actuator means selectively and longitudinally to move said clutch discs to cause said spread reaction disc to have said initial relative rotation with respect to said clutch discs; and a speed governor controlling the operation of said longitudinal actuator means.

8. A two-speed transmission comprising: a driven shaft; two driving members rotatable at different speeds about the same axis as said driven shaft, and each having a different drive surface; two clutch discs rotationally free from and longitudinally movable on said driven shaft and engageable each with a said different drive surface; a spread reaction disc between, coaxial with, having initial relative rotation with, and having a limit of spread relatively to, said clutch discs and rotationally fixed on said driven shaft; ball and groove means between said reaction disc and said clutch discs energized into locking engagement by said initial relative rotation; longitudinal actuator means selectively and longitudinally to move said clutch discs to cause said spread reaction disc to have said initial relative rotation with respect to said clutch discs; and a speed governor controlling the operation of said longitudinal actuator means.

9. A two-speed transmission comprising: a driven shaft; two driving members rotatable at different speeds about the same axis as said driven shaft and each having a different driving surface; two clutch discs longitudinally movable each into engagement with a said different drive surface; a spread reaction disc between, coaxial with, having initial relative rotation with, and having a limit of spread relatively to said clutch discs; spreader and locking means energized into selective locking engagement between said driven shaft, said reaction disc and either of said clutch discs by said initial relative rotation; and longitudinal actuator means selectively and longitudinally to move said clutch discs to cause said spread reaction disc to have said initial relative rotation with respect to said clutch discs.

10. A two-speed transmission comprising: a driven shaft; two driving members rotatable at different speeds about the same axis as said driven shaft and each having a different driving surface; two clutch discs longitudinally movable each into engagement with a said different drive surface; a spread reaction disc between, coaxial with, having initial relative rotation with, and having a limit of spread relatively to said clutch discs; spreader and locking means energized into selective locking engagement between said driven shaft, said reaction disc and either of said clutch discs by said initial relative rotation; and longitudinal actuator means selectively and longitudinally to move said clutch discs to cause said spread reaction disc to have said initial relative rotation with respect to said clutch discs, said spreader and locking means including ball and groove constructions between said reaction disc and both of said clutch discs and a key between at least one of said discs and said driven shaft.

11. A two-speed transmission arrangement comprising: a variable speed shaft; a clutch driven shaft; two clutch driving members driven at different speed ratios from said variable speed shaft about the same axis as said driven shaft, and each having a different driving surface; two clutch discs longitudinally movable each into engagement with a said different drive surface; a spread reaction disc between, coaxial with, having initial relative rotation with, and having a limit of spread relatively to said clutch discs; spreader and locking means energized into selective locking engagement between said driven shaft, said reaction disc and either of said clutch discs by said initial relative rotation; and longitudinal actuator means selectively and longitudinally to move said clutch discs to cause said spread reaction disc to have said initial relative rotation with respect to said clutch discs.

12. A two-speed transmission arrangement comprising: a variable speed shaft; a clutch driven shaft; two clutch driving members driven at different speed ratios from said variable speed shaft about the same axis as said driven shaft, and each having a different driving surface; two clutch discs longitudinally movable each into engagement with a said different drive surface; a spread reaction disc between, coaxial with, having initial relative rotation with, and having a limit of spread relatively to said clutch discs; spreader and locking means energized into selective locking engagement between said driven shaft, said reaction disc and either of said clutch discs by said initial relative rotation; and longitudinal actuator means selectively and longitudinally to move said clutch discs to cause said spread reaction disc to have said initial relative rotation with respect to said clutch discs, said spreader and locking means including ball and groove constructions between said reaction disc and both of said clutch discs and a key between at least one of said discs and said driven shaft.

13. A two-speed transmission comprising: a driven shaft; two independently rotatable driving members rotatable about the same axis as said driven shaft and each having a different driving surface; two clutch discs rotatably free and longitudinally movable around said driven shaft and into engagement with a said different drive surface; a spread reaction disc longitudinally and rotationally fixed to said driven shaft between said clutch discs; spreader means between said reaction disc and each of said clutch discs energized into selective locking engagement by initial relative rotation between said reaction disc and either of said clutch discs; and longitudinal actuator means selectively and longitudinally to move said clutch discs to cause said spread reaction disc to have said initial rotation with respect to said clutch discs.

14. A two-speed transmission comprising: a driven shaft; two independently rotatable driving members rotatable about the same axis as said driven shaft and each having a different driving surface; two clutch discs rotatably free and longitudinally movable around said driven shaft and into engagement with a said different drive surface; a spread reaction disc longitudinally and rotationally fixed to said driven shaft between said clutch discs; a ball and groove construction between said reaction disc and each of said clutch discs energized into selective locking engagement by initial relative rotation between said reaction disc and either of said clutch discs; and longitudinal actuator means selectively and longitudinally to move said clutch discs to cause said spread reaction disc to have said initial rotation with respect to said clutch discs.

15. A two-speed transmission comprising: a driven shaft; two independently rotatable driving members rotatable about the same axis as said driven shaft and each having a different driving surface; two clutch discs rotatably free and longitudinally movable around said driven shaft and into engagement with a said different drive surface; a spread reaction disc longitudinally and rotationally fixed to said driven shaft between said clutch discs; a three ball and groove construction between said reaction disc and each of said clutch discs energized into selective locking engagement by initial relative rotation between said reaction disc and either of said clutch discs; and longitudinal actuator means selectively and longitudinally to move said clutch discs to cause said spread reaction disc to have said initial rotation with respect to said clutch discs.

16. A two-speed transmission arrangement comprising: a variable speed automobile shaft; a pulley construction on said shaft; a clutch driven shaft for a refrigerant compressor; two clutch driving pulleys on said clutch driven shaft; two different ratio belts between said pulley construction and said pulleys; clutches between said pulleys and driven shaft; a speed governor on one of said pulleys selectively actuating said clutches; and a manual control for placing said clutching arrangement selectively in driving and non-driving condition.

17. A two speed arrangement comprising: a shaft, a two speed drive provided with a member for each drive separately rotatable about the axis of said shaft, said members having different drive surfaces, two clutch elements movable along the axis of said shaft each into engagement with a different drive surface, spread reaction means between said clutch elements coaxial with said shaft, and cooperating means between said spread reaction means and said clutch elements for alternately moving said clutch elements away from said reaction means upon opposite relative rotation of said reaction means and said clutch elements.

18. In combination: an automobile variable speed shaft; a driven shaft for a refrigerant compressor; a variable speed drive between said variable speed shaft and said driven shaft, clutch means cooperating with said variable speed drive to make effective different drive ratios, and a speed governor responsive to the speed of said variable speed shaft for actuating said clutch means to select different drive ratios of said variable speed drive, and a selective manual control for said clutch means for placing said clutch means in driving and non-driving conditions.

References Cited in the file of this patent

UNITED STATES PATENTS

| | | |
|---|---|---|
| 1,823,129 | Smith et al. | Sept. 15, 1931 |
| 2,055,177 | Lyman | Sept. 22, 1936 |
| 2,056,050 | Harris | Sept. 29, 1936 |
| 2,075,211 | Lewis | Mar. 30, 1937 |
| 2,185,022 | Candor | Dec. 26, 1939 |
| 2,230,293 | Harris | Feb. 4, 1941 |
| 2,398,716 | Ojutkangas | Apr. 16, 1946 |
| 2,441,926 | Zahn et al. | May 18, 1948 |
| 2,496,937 | Edwards | Feb. 7, 1950 |
| 2,538,667 | Chamberlin | Jan. 16, 1951 |